United States Patent [19]

Shafi

[11] Patent Number: 5,050,041

[45] Date of Patent: Sep. 17, 1991

[54] MODEM MOUNTABLE IN WALL OF A COMPUTER HOUSING WITH READILY ACCESSIBLE, ON/OFF SWITCH, INDICATOR MEANS AND INTERNAL SWITCH CONNECTING EITHER MODEM OR AN AUXILIARY SERIAL PORT TO AN I/O PORT

[76] Inventor: Max Shafi, 3031 Kaiser Dr. #D, Santa Clara, Calif. 95051

[21] Appl. No.: 543,671

[22] Filed: Jun. 25, 1990

[51] Int. Cl.$^5$ .......................... H05K 7/14; H05K 5/00
[52] U.S. Cl. .......................................... 361/391; 375/8; 361/392; 361/395; 361/399
[58] Field of Search ..................... 375/8; 361/391, 393, 361/394, 392, 395, 399; 364/708; 307/116, 139

[56] References Cited

U.S. PATENT DOCUMENTS 4,878,196 10/1989 Rose .................................... 375/8 X
4,980,800 12/1990 Furuta ................................ 361/391

FOREIGN PATENT DOCUMENTS 939582 10/1963 United Kingdom ................ 361/394

OTHER PUBLICATIONS

"Mac Bottom 45 SCSI and Internal Modem", Fred Terry, *Mac User*, vol. 3, No. 10, pp. 66, Oct. 1987.

Primary Examiner—Leo P. Picard
Assistant Examiner—Michael W. Phillips
Attorney, Agent, or Firm—Rosenblum, Parish & Bacigalupi

[57] ABSTRACT

Computer apparatus including a modular modem device having communications indicators and an on/off switch provided in its front panel and an external configuration suitable for insertion into a slot provided in the front or side wall of a computer housing. Communications jacks, I/O connectors and power leads are provided at the rear thereof for connection to corresponding terminals of the computer. The on/off switch controls a tri-stateable switching device which captures a serial I/O port of the computer when the modem is in use but releases the port when the modem is not in use.

8 Claims, 3 Drawing Sheets

MODEM MOUNTABLE IN WALL OF A COMPUTER HOUSING WITH READILY ACCESSIBLE, ON/OFF SWITCH, INDICATOR MEANS AND INTERNAL SWITCH CONNECTING EITHER MODEM OR AN AUXILIARY SERIAL PORT TO AN I/O PORT

BACKGROUND OF THE INVENTION

1. Field of the Invention

The present invention relates generally to computer apparatus, and more particularly to an improved computer housing and associated front-mountable communications modem.

2. Description of the Prior Art

Modems currently available for personal computer applications are of two general types: (1) an internal modem typically contained on a single printed circuit board and adapted to be inserted into an expansion slot provided within the computer case or housing; and (2) an external modem which is a self-contained free-standing device having its own power supply and is plug-connectible to an I/O port of the computer.

Although the internal modem is conveniently disposed within the computer housing and does not require an AC adapter or external cabling, it has the disadvantages that it provides no visual display of modem activity, it requires that the entire computer be shut down and rebooted in the case of a modem jam, and it usually conflicts with the multi-I/O card and sometimes with other serial I/O cards in the system. Furthermore, the internal modem requires the provision of a dedicated I/O slot and reserves a serial I/O port even when not in use.

In contrast, the external modem frequently includes one or more indicators displaying the communications activity of the telephone line and is provided with a separate on/off control switch for turning on the modem. This latter feature is convenient if the modem should hang up in that it allows the user to merely reboot the modem rather than the entire computer system. The principal disadvantage of the external modem is that it requires the provision of an AC adapter or the internal provision of an AC-to-DC converter; it requires desktop space or otherwise occupies a volume of space useful for other purposes; it requires external cabling for connecting it to the computer and, unless disconnected from the computer, requires that a serial I/O port be reserved even when not in use.

OBJECTS OF THE PRESENT INVENTION

It is therefore a principal objective of the present invention to provide a newly configured modem and associated computer housing having communications indicators and an on/off switch readily accessible to the user.

Another object of the invention is to provide a computer housing having a modem-mounting compartment facility in a front or side panel thereof.

Still another object of the present invention is to provide a specially configured modem suitable for mounting in a slot in the front of a computer housing and having means for releasing the occupied serial I/O port when it is not in use.

Still another object of the present invention is to provide a modular modem device adapted to be mounted in a compartment which opens to the front of a computer housing and which is adapted to obtain its power from the main power supply of the computer.

Briefly, a presently preferred embodiment of the present invention includes a modular modem device having communications indicators and an on/off switch provided in its front panel and an external configuration suitable for insertion into a slot provided in the front or side wall of a computer housing. Communications jacks, I/O connectors and power leads are provided at the rear thereof for connection to corresponding terminals of the computer. The on/off switch controls a tri-stateable switching device which captures a serial I/O port of the computer when the modem is in use but releases the port when the modem is not in use.

An important advantage of the present invention is that it provides a readily accessible modem having all of the advantages of both internal and external modems but none of the disadvantages thereof.

Another advantage of the present invention is that it provides a modem in a convenient location with conveniently accessible indicators and on/off switch.

Still another important advantage of the present invention is that it does not occupy a serial I/O port when not in use.

These and other advantages of the present invention will no doubt become apparent to those skilled in the art after having read the following detailed description of the preferred embodiments depicted in the several figures of the drawing.

IN THE DRAWING

DETAILED DESCRIPTION OF THE PREFERRED EMBODIMENTS

Figure 1:
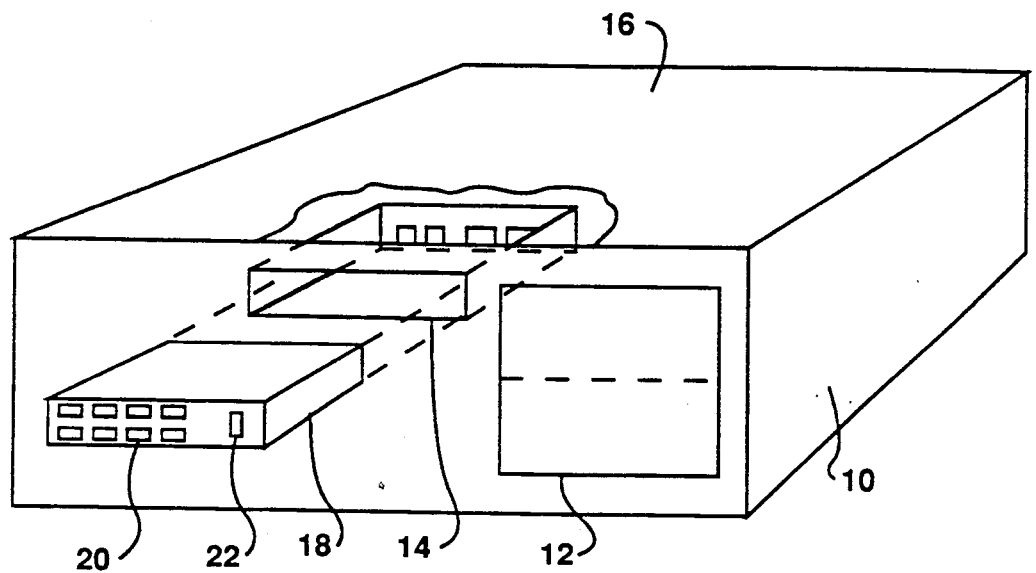
FIGS. 1 and 2 are simplified perspective views showing computer housings modified to include front modem slots in accordance with the present invention.

Referring now to FIG. 1 of the drawing, a computer housing or case specially configured in accordance with the present invention is shown at 10. As indicated, the front panel of the housing is provided with a plurality of half-height or quarter-height slots 12, normally intended to receive floppy disk drives, hard disk drives or tape back-up drives. Housing 10 also includes an additional slot for receiving a modem in accordance with the present invention. A slot 14 will typically include mounting rails, brackets or walled surfaces for supporting a modem device positioned therewithin, and the rear surface 16 will be provided with appropriate openings for cables or jacks and connectors for enabling interconnection of the modem to the computer and to external communications lines.

A modem in accordance with the present invention is generally depicted at 18 in exploded relationship to the slot 14. Note that modem 18 includes a plurality of visual indicators 20 for annunciating communications activity and an on/off switch 22 readily accessible to the user. As will be further discussed below, modem 18 may be of a type which is permanently mounted to housing 10 or may be adapted for easy insertion and removal from slot 14.

Figure 2:
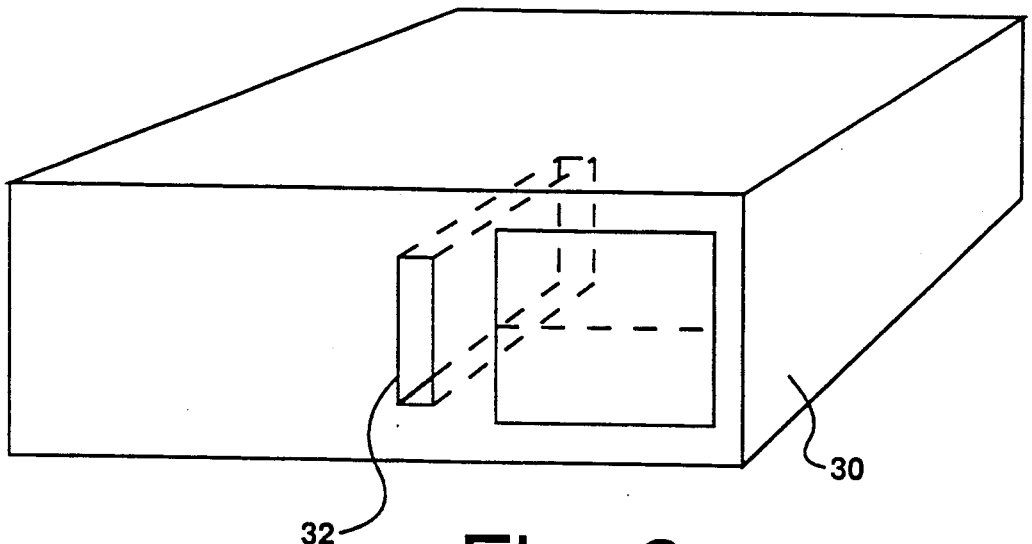

In FIG. 2 a housing 30 is depicted similar to that of FIG. 1 except that the modem slot 32 is oriented vertically rather than horizontally as depicted in FIG. 1. It will of course be appreciated that the slots 14 and 32 can be positioned to extend into any wall of the computer housing at any suitable position. However, in accordance with the preferred embodiment, the slots would normally be positioned as depicted in FIGS. 1 and 2. It will also be understood that the modem could also be mounted to the rear side of the front face of the computer housing so as to be accessible through openings provided in the front face.

Figure 3:
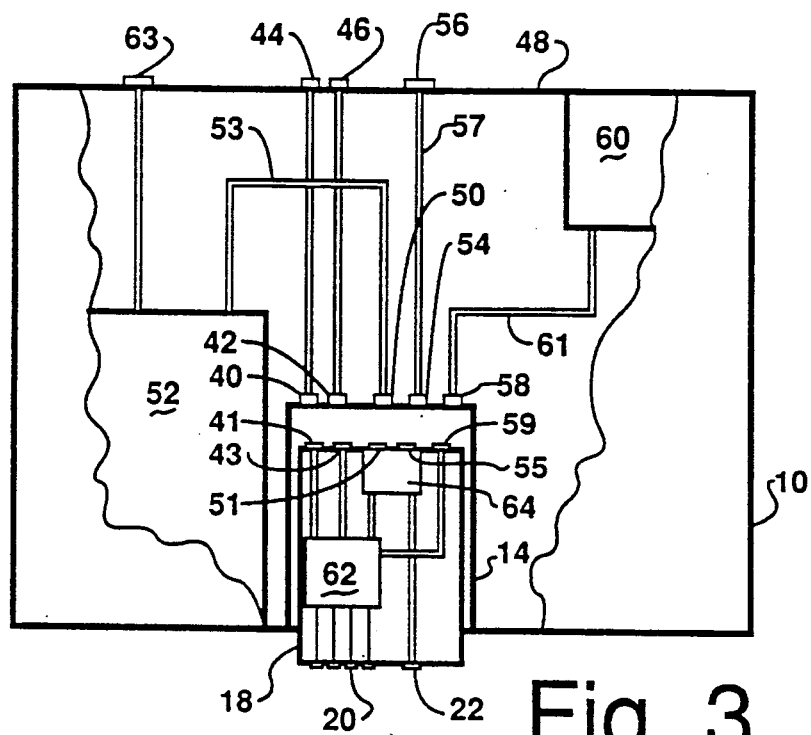
FIGS. 3 and 4 are partially broken top plan views depicting alternative connection arrangements for a modem inserted into a slot of the type depicted in Fig. 1.
Figure 4:
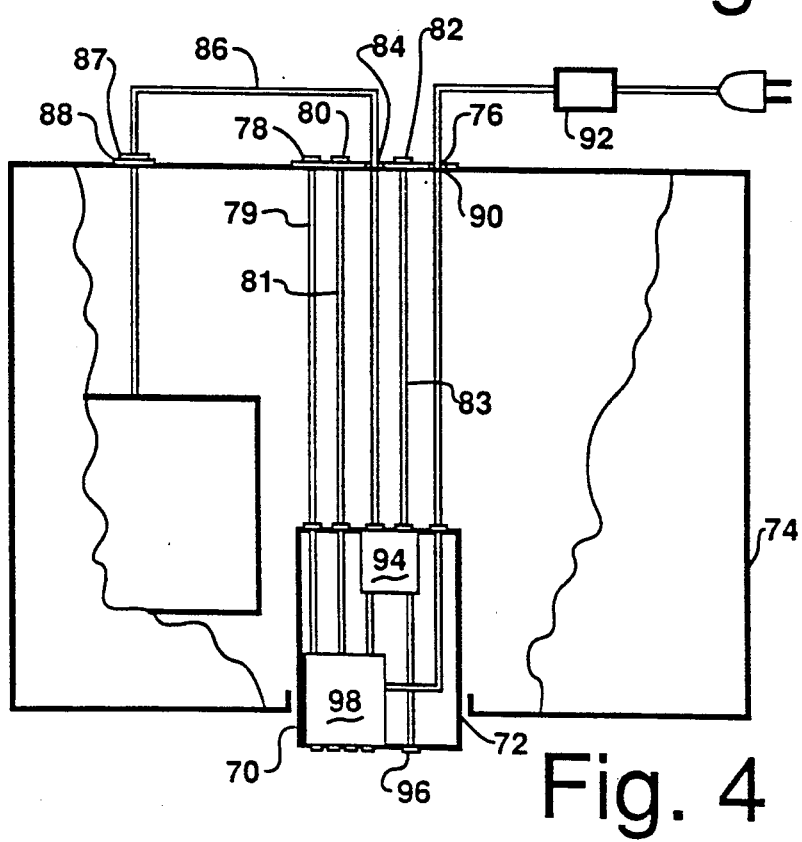

Turning now to FIGS. 3 and 4 which are plan views of the housing shown in FIG. 1, partially broken away to show alternate methods of modem interconnection. In FIG. 3 slot 14 is provided with a pair of telephone jacks 40 and 42 connected to corresponding jacks 44 and 46 on the rear cover plate 48 of housing 10, a ten-pin serial port 50 connected to mother board 52 by suitable cabling 53, a ten-pin jack 54 connected to a serial port 56 by suitable cabling 57, and a power jack 58 connected to power supply 60 by a conductor 61. Housing 10 also includes a second serial port 63 connected to mother board 52.

Modem 18 is provided with mating plugs 41, 43, 51, 55 and 59 for mating with the several jacks referred to above as the modem is seated in position within slot 14. Note that modem 18 includes conventional modem circuitry generally indicated at 62, and a tri-stateable switch 64 responsive to on/off switch 22 and operative to alternatively connect modem 62 to mother board 52 via plug 51, jack 50 and cabling 53 when switch 66 is in the on position, or to connect I/O port 56 to mother board 52 via cabling 57, jack 54, plug 55, plug 51, jack 50 and cable 53.

Note that the modem is powered by the system power supply 60 via the interconnection of plug 59, jack 58, a power cord 61, and drives one or more communications indicators 20 on the front panel of the modem unit.

In FIG. 4, a similar modem device 70 is depicted within a slot 72 provided in the front panel of a computer housing 74. In this embodiment, the modem is provided with cabling and an associated rear panel insert plate 76 for enabling the modem to be connected to a commercially available computer housing without modification of any internal wiring. The slot 72 may be a specially provided opening or may be a vacant opening normally used for other peripheral components.

In this embodiment, rear panel plate 76 includes telephone jacks 78 and 80 which are connected to modem unit 70 by cables 79 and 81, respectively. A ten-pin serial port 82 is provided which is connected to unit 70 by suitable cabling 83, and an opening 84 is provided for serial cabling 86 which includes a plug 87 for connection to I/O port 88. A second opening 90 is provided for accommodating the powering of modem 70 by an external AC adapter 92, or, if modem 70 includes its own power supply, a power cord could be inserted through opening 90.

As in the previously described embodiment, modem 70 includes a switching means 94 which is responsive to a front panel switch 96 and operative to connect modem circuitry 98 when switch 96 is in the on position, and to connect auxiliary I/O port 82 to I/O port 88 when switch 96 is in the off position. Although this embodiment has most of the benefits associated with the FIG. 3 embodiment, it does have the disadvantage of requiring the use of an AC adapter 92 or other external means for the provision of power.

Figure 5:
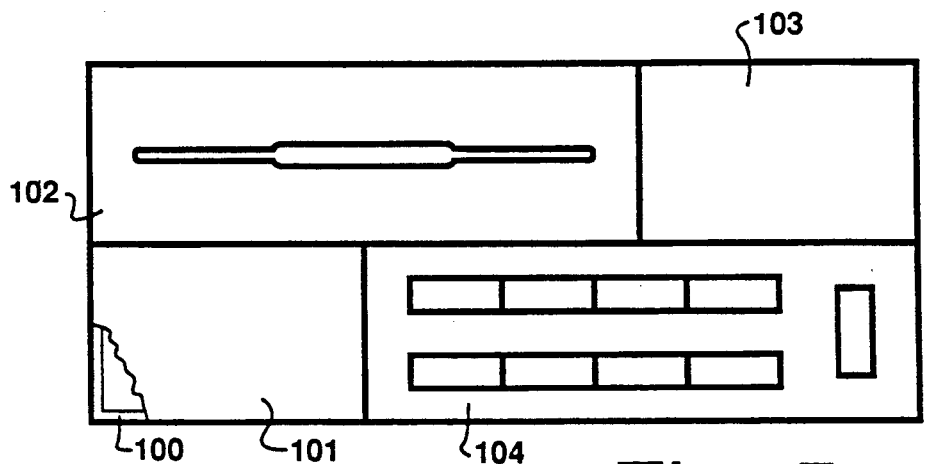
FIG. 5 depicts a modified mounting arrangement in which a modem in accordance with the present invention is combined with a floppy disk drive or the like so that the two can be jointly mounted within a half-height slot in the front of a computer housing.
Figure 6:
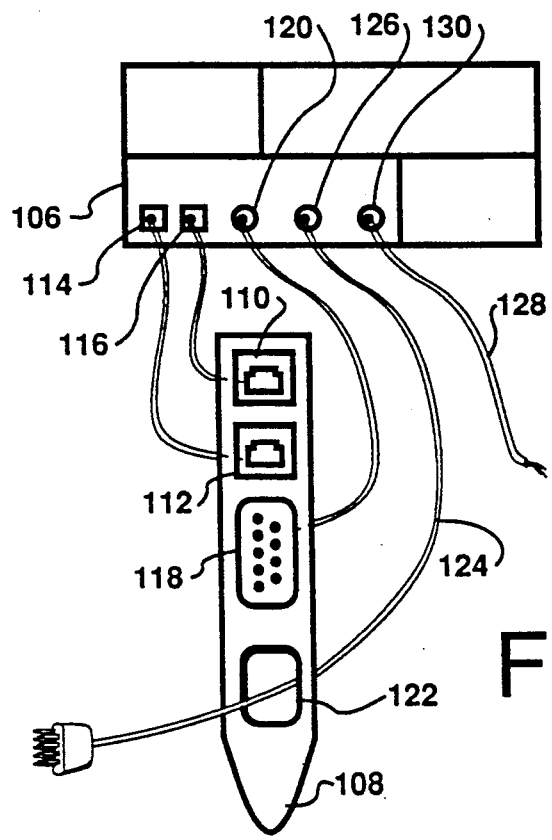
FIG. 6 is a diagram illustrating the rear of the modem arrangement of FIG. 5 together with a specially configured connection panel for mounting at the rear of a computer housing.

In FIGS. 5 and 6, yet another alternative form of the present invention is depicted wherein a framework 100 is provided for combining an additional peripheral such as a floppy disk drive 102 with a modem 104 in accordance with the present invention. The unit is configured as required to accommodate the combined components and is adapted to fit within a standard half-height drive slot of a conventional computer housing. Unoccupied portions of the unit are covered with small face plates 101 and 103.

In FIG. 6 the rear side thereof is depicted in association with a rear panel insert 108 having a pair of telephone jacks 110 and 112 connected to corresponding terminals 114 and 116 of modem 106, a ten-pin serial port jack 118 connected by a suitable cable to modem 106 at 120, and an opening 122 for the serial data cable 124 coupled to modem 106 at 126. Power for the unit could be either external or internal and applied via conductors 128 and connected at 130.

It will thus be appreciated that the present invention can take numerous forms but in general terms involves the provision of a readily accessible modem conveniently located in a wall of a computer housing with conveniently placed communications indicators and an on/off switch. In addition, the preferred embodiment includes a switching means for allowing the modem to occupy an I/O port when in use but to free such port for alternative use when the modem is not in operation. Although numerous modifications and alterations of the present invention will no doubt become apparent to those skilled in the art after having read the above disclosure, it is intended that the appended claims be interpreted as covering all such alterations and modifications as fall within the true spirit and scope of the invention.

What is claimed is:

1. In a computer device having communications capability, the improvements comprising:
    a computer housing including means provided in a wall thereof readily accessible and visible to a user for mounting a modem device;
    a modem device affixed to said housing and having indicator means and on/off switch means accessible through said wall; said modem device further including means forming an auxiliary serial port and switch means responsive to said on/off switch and operative to connect said modem device to said I/O port when said on/off, switch is in the on position, and to connect said auxiliary serial port to said I/O port when said on/off switch is in the off position;
    means for connecting said modem device to external communications lines;
    means for connection of said modem device to an I/O port of the computer device; and
    means for coupling said modem drive to a suitable source of power.

2. In a computer device as recited in claim 1 wherein said computer housing is provided with a front slot specially configured to receive said modem device, the front panel of said modem device being substantially flush with the front panel of said computer housing.

3. In a computer device as recited in claim 1 and further comprising means for enabling said modem device to be combined with an additional peripheral device and inserted into an existing peripheral slot provided in said computer housing.

4. In a computer device as recited in claim 3 and further comprising means for enabling said modem device to be combined with an additional peripheral device and inserted into an existing peripheral slot provided in said computer housing.

5. Modem apparatus for insertion into a slot formed in the front of a computer housing comprising:
   electronic modem circuitry;
   means for providing power to said modem circuitry;
   a front panel having an on/off switch;
   at least one jack for connecting said modem circuitry to an external communications line;
   means forming an auxiliary I/O port;
   means for connection of said modem circuitry to a computer I/O port; and
   switching means responsive to said on/off switch for connecting said modem to said computer I/O port when said on/off switch is in the on position and for connecting said auxiliary I/O port to said computer I/O port when said on/off switch is in the off position.

6. Modem apparatus as recited in claim 5 wherein said switching means is a tri-stateable switching device.

7. Modem apparatus as recited in claim 5 and further comprising indicator means disposed in said front panel for indicating communications activity when said modem circuitry is in use.

8. Modem apparatus as recited in claim 5 and further comprising supporting framework means for additionally supporting a peripheral device and adapted to enable said modem apparatus and said peripheral device to be mounted in a conventional disk drive slot.

* * * * *